United States Patent [19]

Tompsett

[11] 3,899,694

[45] Aug. 12, 1975

[54] COMPENSATING REFERENCE VOLTAGE CIRCUIT FOR SEMICONDUCTOR APPARATUS

[75] Inventor: Michael Francis Tompsett, New Providence, N.J.

[73] Assignee: Bell Telephone Laboratories, Incorporated, Murray Hill, N.J.

[22] Filed: Feb. 8, 1974

[21] Appl. No.: 440,643

[52] U.S. Cl. ................ 307/304; 307/205; 307/208; 307/297

[51] Int. Cl.[2] ................... H03K 3/353; H03K 19/08

[58] Field of Search ........... 307/221 C, 221 D, 208, 307/297, 304, 205

[56] References Cited

UNITED STATES PATENTS

| | | | |
|---|---|---|---|
| 3,666,972 | 5/1972 | Sangster | 307/304 |
| 3,737,683 | 6/1973 | Sangster | 307/304 |
| 3,745,383 | 7/1973 | Sangster | 307/304 |
| 3,819,954 | 6/1974 | Butler et al. | 307/221 D |
| 3,831,041 | 8/1974 | Krambeck et al. | 307/304 |
| 3,838,438 | 9/1974 | Silversmith et al. | 307/221 C |

*Primary Examiner*—Stanley D. Miller, Jr.
*Attorney, Agent, or Firm*—D. I. Caplan

[57] ABSTRACT

In a semiconductor charge transfer device (CTD) containing many semiconductor transfer storage sites for digital signal charge transfer, it is useful to insert local charge regenerators between typically every fifty or so such sites in order to detect and restore the local digital signal charge back to its original value. Such regenerators require the availability of an applied voltage equal to a common external reference voltage less twice the local threshold voltage (for surface channel formation) at each pair of the local transfer sites associated with each of the charge regenerators. This invention provides a transistor circuit for providing such a voltage, which is readily integrated into the CTD.

11 Claims, 2 Drawing Figures

COMPENSATING REFERENCE VOLTAGE CIRCUIT FOR SEMICONDUCTOR APPARATUS

FIELD OF THE INVENTION

This invention relates to semiconductor apparatus, more specifically to control circuitry for semiconductor charge transfer devices.

BACKGROUND OF THE INVENTION

Semiconductor charge transfer devices (CTD) are a form of shift register or delay line devices, in which an input data stream sequence of signal input charge packets is sequentially delayed and shifted through a succession of localized semiconductor charge transfer stages in a semiconductor medium. Each such transfer stage includes an integral number of charge storage sites to which a timed clock pulse sequence of voltage pulses is applied. There are as many storage sites per transfer stage as there are phases in the clock pulses. The desired sequential charge shift and storage operations through the CTD are obtained by means of a timed clock sequence of signal charge transfers from site to site which results in response to the correspondingly timed clock sequence of voltages applied to the storage sites.

In each of the charge transfers in a CTD, an undesirable degradation of signal charge occurs. Such degradation is cumulative and limits the total number of useful charge transfers through the CTD. Consequently, in the case of digital signals, i.e., presence or absence of charge (1 or 0), charge regenerators are inserted every predetermined number of storage sites, typically every 50 or so of such sites, in order to detect and restore the (digital) signal to its initial value (1 or 0). These charge regenerators are described in detail in U.S. Pat. applications, Ser. Nos. 114,624 and 114,625, both filed on Feb. 11, 1971, as well as in U.S. Pat. application, Ser. No. 337,669, filed on Mar. 2, 1973, now U.S. Pat. No. 3,838,438, issued Sept. 24, 1974 all assigned to the same assignee as the present application. Briefly, a charge regenerator typically comprises transistor circuitry integrated locally in the same semiconductor chip as the CTD itself, advantageously in the neighborhood of the corresponding charge transfer storage site whose signal is to be detected and regenerated. Ordinarily, a storage site comprises an insulated gate field effect transistor (IGFET) which is integrated into the semiconductor charge storage medium. Each such regenerator detects the local signal charge at the corresponding local IGFET storage site, determines whether such signal is below or above midway between 1 or 0, and delivers a restored signal charge 1 or 0 to the next local storage site through a local semiconductor input diode in the immediate neighborhood thereof. However, in order to minimize errors in this signal charge restoration process by the regenerator, it is desirable for the purpose of uniformity of signal regardless of location in the CTD to have available an applied voltage, for application to each input diode controlled by each regenerator, this applied voltage being equal to a standard "reference" voltage ($V_{ref}$) common to all regenerators less twice the local surface channel threshold voltage ($V_T$) of the semiconductor in the neighborhood of the controlled input diode, that is, a voltage equal to ($V_{ref} - 2V_T$) for p-type surface channels in n-type semiconductor and ($V_{ref} + 2V_T$) for n-type channels in p-type semiconductor. In view of the need for many such charge regenerators integrated on different semiconductor wafers, or at widely spaced locations on the same wafer, the requisite ($V_{ref} - 2V_T$) varies for the different input diodes controlled by different regenerators due to variations in $V_T$ with location. It would therefore be desirable to have a circuit for providing these different values of ($V_{ref} - 2V_T$) for the different input diodes controlled by the different charge regenerators. More generally, it would be desirable in semiconductor technology to have locally available a voltage which differs from an external reference voltage by an integral number of local channel threshold voltages of a semiconductor body, i.e., ($V_{ref} - NV_T$) (where N is a positive integer for p-type channels and a negative integer for n-type channels).

SUMMARY OF THE INVENTION

A multiple phase clock pulse voltage source is used for driving an auxiliary IGFET control circuit for supplying a voltage equal to ($V_{ref} - NV_T$) where N is an integer. The auxiliary IGFET control circuit includes the number N of cascaded substantially identical IGFET devices having p-type surface channels suitably controlled by the clock pulse voltages. As known in the art, each such IGFET device can be in a relatively highly conducting ("ON") state with respect to current flow between its source and drain terminals, or in a relatively insulating ("OFF") state with respect to such current flow. More specifically, the first IGFET of the control circuit has its gate terminal voltage controlled by $V_{ref}$ and its source terminal voltage controlled by one phase of the clock voltage source; while the other IGFET devices have their gate terminal voltages controlled by the drain voltages of the immediately preceding transistor, and their source terminal voltages controlled by a suitable phase of the clock pulse voltage source. In particular, the sources of all IGFET devices are controlled by alternate clock phases, that is, the first IGFET by the first clock phase, the second IGFET by the second clock phase, the third IGFET (if any) by the first clock phase, the fourth IGFET (if any) by the second clock phase. In addition, the drain terminal of a switching IGFET, whose source voltage is controlled by the drain voltage of the last one of the N-cascaded IGFET's and whose gate is controlled by a clock phase voltage so as to be ON only when the last IGFET is OFF, provides the desired ($V_{ref} - NV_T$).

This arrangement is expected to have the advantage of suffering minimal power loss during operation, by suitable choice of the clock pulse voltage levels. More generally, if the N in number-cascaded IGFET devices in the control circuit are not substantially identical as to threshold voltages, then the circuit will supply an output terminal voltage equal to $V_{ref}$ minus the sum of the threshold voltages of the cascaded IGFET devices. Moreover, by using n-type surface channel IGFET devices, then ($V_{ref} + NV_T$) can be obtained as the output voltage. In any event, by locating each such control circuit in close proximity to the controlled input diode of the charge transfer device on the same semiconductor wafer using integrated circuit techniques, the appropriate local ($V_{ref} - NV_T$) can be supplied by the control circuit of this invention, even if $V_T$ varies with (widely spaced) positions on the same wafer or from wafer to wafer.

BRIEF DESCRIPTION OF THE DRAWING

This invention, together with its features, objects, and advantages, may be better understood from the following detailed description when read in conjunction with the drawing in which.

DETAILED DESCRIPTION

Figure 1:
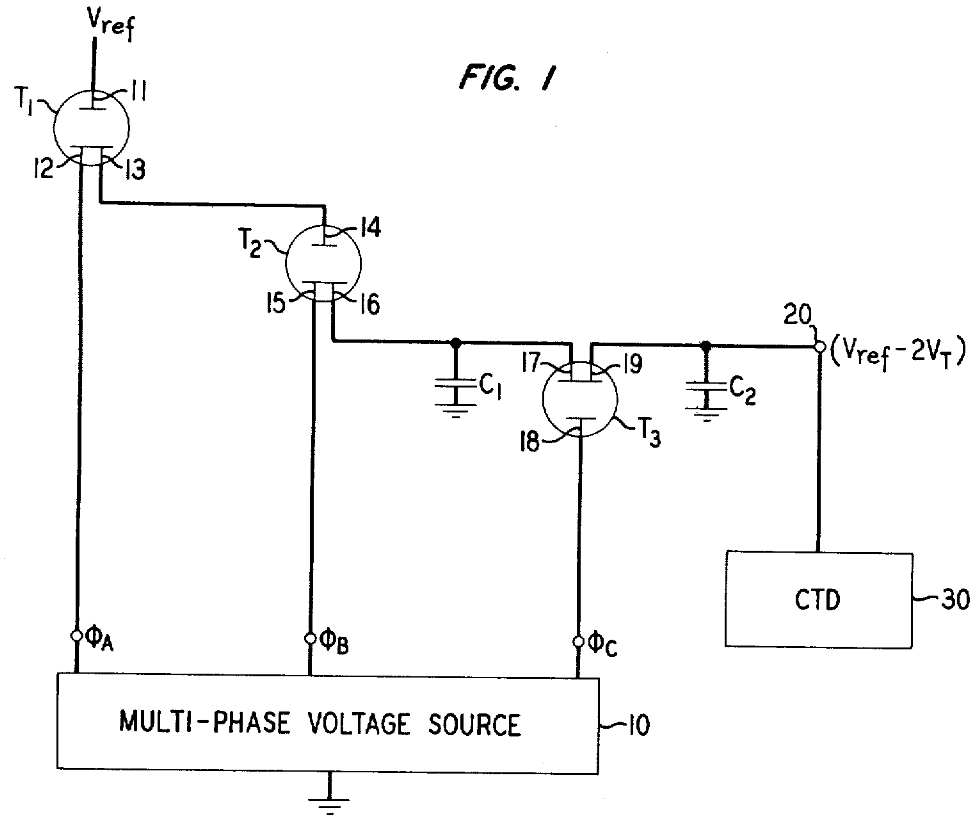
FIG. 1 is a schematic circuit diagram of a compensating reference voltage circuit for semiconductor apparatus, according to a specific embodiment of the invention.

In the circuit shown in FIG. 1, an input direct current reference voltage ($V_{ref}$), applied to input terminal 11, is compensated by the circuit so as to yield an output compensated voltage ($V_{ref} - 2V_T$) at an output terminal 20. Here $V_T$ is the threshold voltage for formation of a surface channel under each of the gates of a pair of neighboring cascaded substantially identical p-type channel IGFET's $T_1$ and $T_2$. These IGFET's are advantageously integrated in close mutual proximity in a semiconductor wafer (chip) in the immediate neighborhood of a controlled device element in the same wafer, which is to be supplied with ($V_{ref} - 2V_T$). For example, this controlled device element can be an input diode for a charge transfer site of a two-phase CTD 30, for utilization of the output voltage at terminal 20. It should be understood, of course, that in case the threshold of $T_1$ is not equal to that of $T_2$, the output at terminal 20 will be equal to $V_{ref}$ less the sum of these unequal threshold voltages.

The terminal 11, controlled by $V_{ref}$, is the gate (low current carrying) terminal of a first insulated gate field effect transistor $T_1$. The source (high current carrying) terminal 12 of $T_1$ is controlled by the periodic voltage pulse $\phi_A$, to be described more fully below, supplied by a multiphase voltage source 10 relative to ground potential. The drain terminal 13 (also high current carrying) of $T_1$ is connected to the gate 14 of a second insulated gate field effect transistor $T_2$. Thereby, the gate voltage of $T_2$ is controlled by the drain voltage of $T_1$, in cascaded fashion. The voltage potential of the source terminal 15 of $T_2$ is controlled by a periodic voltage pulse $\phi_B$ supplied by the voltage source 10. The drain terminal 16 of $T_2$ is connected to the source terminal 17 of a switching IGFET $T_3$, so that the source potential of $T_3$ is controlled by the drain potential of $T_2$. A storage capacitor $C_1$ is connected from the connecting lead between terminals 16 and 17 to ground. The gate terminal 18 of $T_3$ is connected to the voltage source 10, whereby the potential of this gate is controlled by a periodic voltage pulse $\phi_C$. The drain terminal 19 of $T_3$ is connected to the output terminal 20, and another storage capacitor $C_2$ is connected from this terminal 20 to ground.

Figure 2:
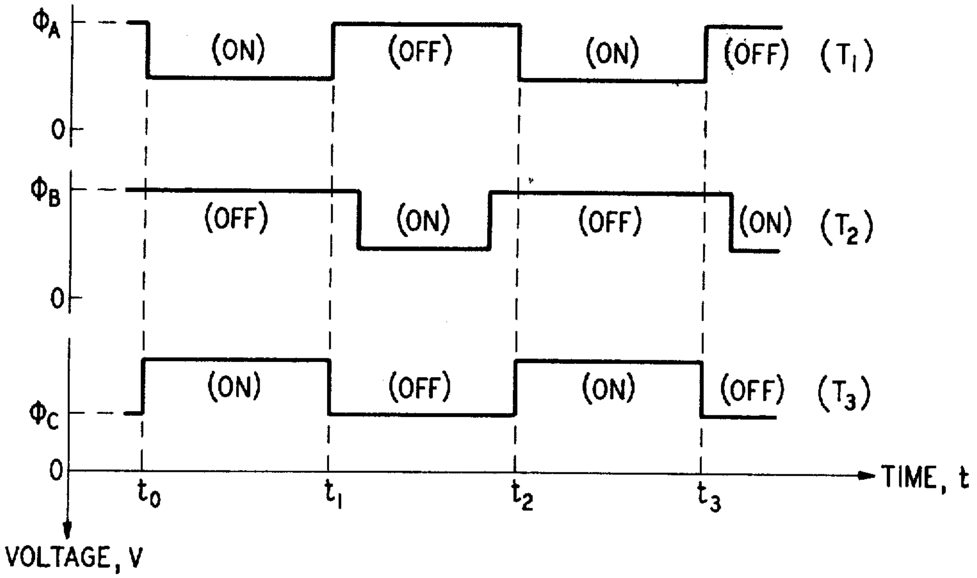
FIG. 2 is a plot of voltages (vs. time) useful in the operation of the circuit shown in FIG. 1.

The time dependences of the periodic pulse voltages $\Phi_A$, $\phi_B$, and $\phi_C$ are indicated in FIG. 2. The times $t_o$, $t_2$ and $t_3$ are advantageously equally spaced on the horizontal time scale. Starting at time $t_o$, $\phi_A$ supplies a pulse (in positive-going sense) during the interval from $t_o$ to $t_1$ (a full half-cycle of a clock sequence), whereas $\phi_B$ and $\phi_C$ are quiescent during this interval $t_o$ to $t_1$. This pulse of $\phi_A$ is selected to be sufficient to cause the transistor $T_1$ to be in its "ON" state from $t_o$ to $t_1$ (and "OFF" otherwise) while $T_1$ is under steady application of gate voltage $V_{ref}$. Then, advantageously, "shortly" after $t_1$, a positive-going pulse of $\phi_B$ is applied to the source terminal 15 of $T_2$ in order to turn $T_2$ into its "ON" state ("OFF" otherwise) until the termination of this $\phi_B$ pulse "shortly" before $t_2$. The term "shortly" here means just enough time after $t_1$ and before $t_2$, respectively, so that $T_1$ and $T_2$ are never simultaneously "ON" at any moment of time. While these pulses of $\phi_A$ and $\phi_B$ are being applied, the clock pulses of $\phi_C$ are applied to the gate terminal 18 sufficient to turn $T_3$ "ON" during time interval $t_o$ to $t_1$ and "OFF" during time interval $t_1$ to $t_2$. Thus, $T_3$ is "ON" only during time intervals throughout which $T_2$ is "OFF." The time interval $t_o$ to $t_2$ represents a single complete clock cycle, which then repeats itself starting at time $t_2$. In this manner, the voltage at the output terminal 20 will reach and be maintained at ($V_{ref} - 2V_T$) after just a few such cycles, where $V_T$ is the common threshold channel voltage for $T_1$ and $T_2$. The capacitors $C_1$ and $C_2$ are advantageously sufficient to smooth out the voltages at the respective terminals to which they are connected, by storing enough charge so that the voltages across these capacitors do not vary substantially over any part of a cycle during operation with a load at the output terminal 20.

In order to minimize the power losses which occur during the "ON" periods of $T_1$ and $T_2$, the pulse of $\phi_A$ is selected such that its voltage pulse level during $t_o$ to $t_1$ (supplied to the source of $T_1$) is set at a value slightly below ($V_{ref} - V_{T_1}$) (where $V_{T_1}$ is the threshold voltage of $T_1$), that is, just enough to turn $T_1$ "ON;" and the pulse of $\phi_B$ is selected such that its voltage pulse level is set at a value slightly below ($V_{ref} - V_{T_1} - V_{T_2}$) (where $V_{T_2}$ is the threshold of $T_2$) during the time interval slightly after $t_1$ to slightly before $t_2$ (when $T_2$ is turned "ON").

The transistor $T_3$ and/or the capacitor $C_2$ can be omitted at some sacrifice of constancy of output voltage for given $C_1$. By omitting $T_2$ and $C_1$ (while connecting the drain of $T_1$ to the source of $T_3$, and the gate of $T_3$ to the complement of $\phi_B$), the output voltage becomes ($V_{ref} - V_T$). By adding more such transistors as $T_2$ in cascade, an output of ($V_{ref} - NV_T$) can be obtained. In all cases, it is important that each and every IGFET be OFF whenever the immediately preceding IGFET is ON, by means of suitable clock pulse phases. The transistors $T_1$, $T_2$ and $T_3$ can all be incorporated together on the same semiconductor substrate as the CTD 30, as known in the art of integrated circuits.

While this invention has been described in terms of a specific embodiment, various modifications can be made without departing from the scope of the invention.

What is claimed is:

1. A circuit which comprises a. a first field effect transistor having a low current carrying terminal controlled by and connected to a reference voltage terminal and having a first high current carrying terminal controlled by and connected to a first clock pulse terminal; and b. a second field effect transistor having a low current carrying terminal controlled by and connected to a second high current carrying terminal of the first transistor and having a first high current carrying terminal controlled by and connected to a second clock pulse terminal, said first and second clock terminals for providing pulses sufficient that the first transistor periodically be ON and OFF while the second transistor be ON only when the first transistor is OFF and that the second transistor be OFF otherwise.

2. The circuit recited in claim 1 in which the first and second transistors are insulated gate field effect transistors, the gate terminal of each transistor being the low current carrying terminal.

3. The circuit recited in claim 2 which further includes circuit means for applying the first and second clock pulses to the first and second clock pulse terminals, respectively, and for applying the reference voltage to the reference voltage terminal.

4. The circuit recited in claim 2 in which a storage capacitor is connected to the second high current carrying terminal of the second transistor in order to smooth out the voltage at the latter terminal.

5. The circuit recited in claim 2 which further includes a third insulated gate transistor having a first high current carrying terminal controlled by and connected to a second high current carrying terminal of the second transistor, the third transistor having a low current carrying terminal controlled by and connected to a third clock voltage terminal such that the third transistor is OFF whenever the second transistor is ON and that the third transistor is ON only when the second transistor is OFF.

6. The circuit recited in claim 5 in which a storage capacitor is connected to a second high current carrying terminal of the third transistor.

7. The circuit recited in claim 5 which further includes circuit means for applying the first, second and third clock pulses to the first, second and third clock pulse terminals, respectively, and for applying the reference voltage to the reference voltage terminal.

8. The circuit recited in claim 7 in which the circuit means is sufficient to supply a first clock pulse which is slightly below the reference voltage minus the threshold voltage of the first transistor.

9. The circuit recited in claim 8 in which the circuit means is sufficient to supply a second clock pulse which is slightly below the reference voltage minus the sum of the threshold voltages of the first and second transistors.

10. A circuit which comprises a. a first insulated gate transistor having a source and a drain, whose gate terminal voltage is controlled by and connected to a reference terminal voltage and whose source terminal voltage is controlled by and connected to a first clock pulse terminal voltage;

b. a second insulated gate transistor having a source and a drain, whose gate terminal voltage is controlled by and connected to the drain terminal voltage of the first transistor and whose source terminal voltage is controlled by and connected to a second clock pulse terminal voltage, the clock pulse terminal voltages being sufficient that the first transistor periodically be ON and OFF while the second transistor be ON only within intervals of time during which the first transistor is OFF and the second transistor be OFF otherwise, in response to said clock pulse voltages;

c. a third insulated gate transistor having a source and a drain, whose source terminal voltage is controlled by and connected to the drain terminal voltage of the second transistor and whose gate terminal voltage is controlled by and connected to a third clock pulse terminal voltage sufficient that the third transistor be ON only during intervals of time when the second transistor is OFF and that the third transistor be OFF otherwise; and d. circuit means for applying the first, second and third clock voltage pulses and reference voltage to the first, second and third clock pulse terminals and the reference voltage terminal, respectively.

11. A circuit which comprises a. a first field effect transistor having a low current carrying terminal controlled by and connected to a reference voltage terminal and having a first high current carrying terminal controlled by and connected to a first clock pulse terminal sufficient to cause the first transistor to be periodically ON and OFF; and b. a second field effect transistor having a first high current carrying terminal controlled by and connected to a second high current carrying terminal of the first transistor and a low current carrying terminal controlled by and connected to a second clock pulse terminal sufficient to cause the second transistor to be ON only during periodic first time intervals and to be OFF otherwise, said periodic first time intervals being contained within those periodic intervals of time during which the first transistor is ON.

* * * * *